United States Patent [19]

van den Hoven et al.

[11] Patent Number: 5,066,509

[45] Date of Patent: Nov. 19, 1991

[54] STORAGE STABLE LIQUEUR OR ALCOHOL-CONTAINING BEVERAGE CONTAINING MEDIUM CHAIN TRIGLYCERIDES

[75] Inventors: Martinus M. G. M. van den Hoven, Veghel; Hermanus W. A. Ermens, Oploo, both of Netherlands

[73] Assignee: DMV Campina B.V., Veghel, Netherlands

[21] Appl. No.: 485,981

[22] Filed: Feb. 27, 1990

[51] Int. Cl.$^5$ .......................... C12G 3/04; A23C 13/14
[52] U.S. Cl. ..................................... 426/592; 426/583
[58] Field of Search ................................. 426/592, 583

[56] References Cited

U.S. PATENT DOCUMENTS

| 3,753,724 | 8/1973 | Selby | 426/592 |
|---|---|---|---|
| 4,031,262 | 6/1977 | Nakayama | 426/583 |
| 4,112,123 | 9/1978 | Roberts | 426/590 |
| 4,414,238 | 11/1983 | Schmidl | 426/602 |
| 4,419,378 | 12/1983 | Rule | 426/592 |
| 4,656,044 | 4/1987 | Sugimoto | 426/592 |
| 4,902,517 | 2/1990 | Nakagawa | 426/592 |
| 4,957,765 | 9/1990 | Widmar | 426/592 |

FOREIGN PATENT DOCUMENTS

| 1184517 | 3/1985 | Canada | 426/592 |
|---|---|---|---|
| 2814122 | 10/1979 | Fed. Rep. of Germany | 426/592 |
| 751900 | 7/1956 | United Kingdom | 426/592 |
| 2084185 | 4/1982 | United Kingdom | 426/592 |
| 2145111 | 3/1985 | United Kingdom | 426/592 |

OTHER PUBLICATIONS

Jrnl of Food Technology, vol. 16, Mar. 1981, pp. 587–595, Banks et al., "Extension of the Shelf Life".
The Milk Industry, vol. 83, No. 5, 1981, Banks et al., pp. 16–18, "The Formulation of Cream-Based Liqueurs".
Jrnl of Food Science, vol. 52, No. 3, Mar./Apr. 1987, pp. 389–393, Donnelly, "Ethanol Stability of Casein Solutions".
Jrnl of Dairy Science, vol. 58, No. 9, Sep. 1975, pp. 1254–1262, Smith et al., "Stability of Milk Fat Emulsions".

*Primary Examiner*—Carolyn Paden
*Attorney, Agent, or Firm*—Michael N. Meller

[57] ABSTRACT

A stable liqueur or alcohol-containing beverage is disclosed which contains medium chain triglycerides. The beverage also contains conventional ingredients such as cream, yoghurt, alcohol, flavoring agents, coloring agents, emulsifiers, stabilizers, sugars, fats, acids and other conventional ingredients.

16 Claims, No Drawings

STORAGE STABLE LIQUEUR OR ALCOHOL-CONTAINING BEVERAGE CONTAINING MEDIUM CHAIN TRIGLYCERIDES

BACKGROUND OF THE INVENTION

1. Field of the Invention

The invention relates to a liqueur or alcohol-containing beverage comprising as ingredients cream, yoghurt or another dairy product, obtained by mixing the dairy product with alcohol or an alcohol-containing liquid, flavouring agents, colouring agents, emulsifiers, stabilizers, sugars or artificial sweetening agents, fats, acids and further conventional ingredients.

Such liqueurs are known from the following patents.

2. Description of Related Art

British patent application GB 2 084 185 discloses the preparation of cream liqueurs on the basis of cream, sugar alcohol, sodium caseinate, flavouring and colouring agents, which comprises adding citrates to improve their stability by binding calcium.

Japanese patent application JA 56/193036 discloses the preparation of cream liqueurs from non acidulated cream, alcohol, sugar and flavouring agents which comprises adding a surfactant, e.g., sodium caseinate, to increase their stability.

European patent application EP 0 067 592 discloses the preparation of cream liqueurs of the same composition as described in JA 56/193036, the surfactant added thereto in connection with their stability being, in addition to a sodium caseinate, an emulsifier having an HLB value of less than 12.

U.S. Pat. No. 4 419 378 discloses the preparation of similar cream liqueurs as described in EP 0 067 592, but without sodium caseinate and with a surfactant having an HLB value of more than 10, to increase their stability.

British patent application GB 2 145 111 discloses the preparation of cream liqueurs of the same composition as described in the above publications, which comprises adding sodium or potassium citrate to increase the emulsion stability, as is known from the older publication GB 2 084 185.

European patent application EP 0 177 077 discloses the preparation of yoghurt liqueurs, which comprises mixing a mixture of fermented or acidulated milk having a pH of 5-3.5 with sugars, flavouring agents, thickening agents and the like, then homogenizing in a special manner and heating to increase the bacteriological stability, followed by admixing alcohol.

British patent application GB 2 176 088 discloses the preparation of powders comprising sodium caseinate, starch or starch syrup, emulsifier and skim milk powder with 58-62% fat of dairy or other origin, said powders, when mixed with sugar, alcohol and water in a household mixer, being capable of providing a cream liqueur, on which few further stability requirements are imposed. The long term stability of the product is based on the fact that a dry powder does not change its properties after its preparation any more than sugar or a strongly alcoholic liquid, and the total beverage can be consumed immediately after mixing these ingredients with water.

As appears from these publications, stability of these dairy liqueurs is generally a problem showing many different aspects. Thus, for instance, the product may be unstable owing to the fact that during storage the viscosity increases even to such an extent that the liqueur gels and cannot be poured out of the bottle anymore. Also, the product may show creaming caused by a fatty layer formed on top of the liquid in the bottle. Or even a more or less clear layer of liquid or whey may separate at the bottom. Furthermore, a precepitate or sediment may be formed, a fat collar may be formed in the neck of the bottle, or more in general, the liqueur may tend to show a non-homogeneous appearance caused by a combination of these deficiencies. Colour and flavour may also change in the course of time, and in general, such a change therefore means a deterioration. It is often possible to remove such deficiencies by selecting suitable emulsifiers, antioxidants, thickeners and stablilizers, or by a proper selection of such ingredients using a special process in which especially the method of heating and homogenizing plays an important part. Considered in itself, a yoghurt liqueur or a cream liqueur is a very complicated colloidal system in which all kinds of counteracting factors play a part. Thus, for instance, in a dairy product the fat will be stabilized to a rather homogeneous and stable emulsion by means of the milk proteins which ipso facto are also colloidally dispersed in micellar form.

When alcohol is added to milk, it mixes with the aqueous phase, but as a result the character of that aqueous phase will also change considerably. Consequently, the protein micelles may be destabilized, and this, in turn, influences the stability of the fat emulsion. For this reason it may be necessary to add emulsifiers to the milk or cream in order to maintain the fat emulsion, and in general, mechanical homogenization will be required to reduce that emulsion in order to inhibit creaming.

For the purpose of avoiding flocculation of protein, stabilizers may be added, such as thickeners or protein-reactive esters, such as sodium stearoyl lactylate. A reduction of the pH in the preparation of yoghurt liqueurs also produces a strong effect on the stability of the colloidal system, because the pH reduction causes the protein to tend to flocculation owing to approach of the isoelectric point. This has an indirect effect on the stability of the fat emulsion.

In order to obtain a stable liqueur, the product must be heated to kill undesirable microorganisms, and in addition to the destabilization caused by alcohol and by pH reduction, the stability is once more disturbed substantially owing to this heating.

In well-known processes one or more of these stability aspects are influenced in different ways by appropriately selecting raw materials and techniques.

In general, all these improvements of the stability are concerned with the stability of the bottled product, as it reaches the customer in the closed bottle. But then new quality problems arise, particularly if the consumer consumes only a part of the contents of the bottle and wants to store the rest until a later time. The contents of the bottle come into contact with fresh air containing oxygen, which promotes oxidative spoilage. Similarly, bacteria and other microorganisms may get into the liqueur and become activated.

While the presence of alcohol inhibits the activity of microorganisms and even causes living bacteria to be killed, the activity of the enzymes produced by bacteria present in the raw materials is not stopped by alcohol. A pasteurizing or, anyhow, enzyme-inhibiting heat treatment, germ-deficient bottling and storage in closed bottles are means for avoiding spoilage in this respect. Also, exclusion of air and protection from light may be important to avoid changes of colour and flavour. Oxidation of flavouring agents is influenced by oxygen and light, so that the product is preferably stored in a closed bottle or jug as long as possible, before it is used.

But once the bottle has been opened, so that the product comes into contact with oxygen from the air, a new type of stability problem arises from the fact that the previously stable product may change its flavour, colour and further proporties within a short period of time. Particularly the flavour of liqueurs on the basis of yoghurt or other types of fermented milk is very sensitive to oxidation by the action of air oxygen. A means for avoiding that deterioration is to replace butterfat by a fully saturated fat, e.g., a hardened vegetable fat. Another means for delaying that deterioration is to store the opened bottle in a refrigerator. But it has been found that this means is not without its drawbacks because, on the one hand, the deterioration is only delayed so that after some time flavour deficiencies will occur notwithstanding, while,on the other hand, another deficiency will become apparent when an oxidation-stable, hardened fat is used in a liqueur.

As a matter of fact, storage at temperatures about 5° C. and less shows that a clot is easily formed within the neck of the bottle, the homogenous emulsion of the liqueur is disturbed, and a disturbing clustering takes place. This results in that the appearance of the liqueur is damaged, the pouring out is impeded, and in addition, the flavour impression of a beverage with clots is not appreciated by the consumers.

SUMMARY OF THE INVENTION

It has now been found that a stable dairy liqueur can be prepared which is storable in cooled and uncooled condition for a considerable time, also after a bottle has been opened, without the occurence of oxidation flavour or fat separation if the fat used for the preparation mainly contains saturated fatty acids having 6-12 carbon atoms. The oils designated as medium chaintriglycerides or MCT oil consist essentially of triglycerides with particularly capric acid, caprylic acid and caproic acid as fatty acid residues. Both fatty acid residues of butyric acid and of lauric acid are present only in slight percentages, and fatty acid residues having more than 12 carbon atoms as well as unsaturated fatty acids are nearly completely absent, hence the use of the term oil of medium chain length. Such MCT oils are used, among others, for the preparation of dietary foods for patients suffering from specific disturbances in the alimentary system and the fat metabolism. Such MCT oils are also used as an aid in the foodstuff industry, e.g., for making subtropical fruit and sweets less sticky or as carrier for flavouring agents. Also in cosmetic articles use is often made of MCT oils.

Such MCT oils are distinguished from other fats by their "average" (or preferably: "moderately high") molecular weight, as a result of which they have a higher saponification number than fats of a greater chain length. For a liqueur according to the invention use is preferably made of an MCT product having a saponification number of at least 325. In particular, products having a saponification number between 335 and 350 are satisfactory. The content of unsaturated fatty acids in the oil used must preferably be low. The iodine number, which is a measure of the content of unsaturated fatty acids, must therefore also be low; preferably the fat used in a liqueur according to the invention must have an iodine number of not more than 5.

Surprisingly, it has now been found that a liqueur containing this oxidation stable MCT oil as a fat ingredient also does not show the drawback of fat clots formed in the neck of the bottle during storage in the refrigerator. Especially if a fat having a turbidity point below 5° C. is used, the stability of the fat emulsion is found to remain in order for many months at a stretch during storage of the liqueur in the refrigerator. Even when the bottle has been opened to use a portion liqueur can thus be easily stored in the refrigerator or outside for use at a later date.

Although the change of the fat competition by using, e.g., vegetable fats in cream liqueurs is generally known, e.g., from GB 2 176 088, this is generally not done for the purpose of obtaining a superior oxidation stability or a higher resistance to instability at refrigerator temperatures.

The butterfat in a cream liqueur can be replaced, e.g., by hardened fat in connection with the substantial difference in price between butterfat and coconut oil or hardened soybean oil. When such products, after the bottle has been opened, are stored in the refrigerator in order to avoid the occurence of flavour deficiencies caused by oxidation, the beverage proves to be unstable as far as the distribution of the fat in the liqueur is concerned. In uncooled condition, such a beverage may tend to show deviations in flavour once the bottle has been opened, especially when the alcohol content is low, and microbiological or enzymatic processes will play their part.

Both oxidative rancidness and cleavage of fat, which may result in a soapy off-flavour rapidly make the liqueur impalatable. In this respect the replacement of butterfat by other conventional fats gives no remarkable improvement. The use of MCT oil according to the invention, however, gives a product showing an excellent refrigerator stability and, in addition, a remarkably high resistance to oxidative,microbiological and enzymatic spoilage This particularly applies to an MCT oil having a turbidity point below 0° C. Such an oil gives the liqueur a good stability, especially during storage in the refrigerator.

MCT-rich oils may be prepared by various methods. Thus, for instance, specific vegetable oils, e.g., oil recovered from Cuphea seeds, are naturally rich in the desired fatty acid residues of medium chain length. But MCT-rich fats can also be prepared by esterification of a suitable fatty acid mixture with glycerine, by transesterfication of fat with a fatty acid mixture or by fractionating existing fats. Fatty acid mixtures suitable for transesterfication are obtained either by synthesis of the fatty acids, e.g., by a paraffing oxidation process or by a biochemicosynthetic process or by cleavage of natural fatty acid mixtures obtained by lipolysis or saponification of natural, animal or vegetable fats. If the MCT oil thus obtained is generally suitable for food purposes,it can also be used for the preparation of liqueur according to the invention. It is then of special importance that the product should contain no free fatty acids or saponification catalysts, nor other byproducts that may adversely affect its flavour.

The starting material for the preparation of a cream liqueur according to the invention will preferably be a fat from milk or cream. Since milk fat partly consists of fatty acids of the desired chain length, suitable fats can be recovered from milk fats by fractionation in a manner known per se. If the milk fat is first cleaved into fatty acids and glycerine and then the most suitable fatty acid fraction is isolated by distillation or otherwise, followed by combining this fraction again with glycerine from the same fat, an MCT oil can be recovered from milk fat in higher yield.

For the purpose of preparing a liqueur according to the invention all the desired ingredients, including alcohol and further flavouring agents, may be admixed and subjected to the required homogenization operations, so as to obtain the desired product suitable for bottling. It is more conventional to first prepare a nonalcoholic base, to which, if that base has been subjected to all the necessary homogenizations, heat treatments and the like, an amount of alcohol and the desired flavouring agents may be added to taste.

The invention is applicable both to neutral liqueurs of the cream liqueur type and to sour beverages of the yoghurt liqueur type.

As a dairy product for the preparation of the invented liqueur there may be used an emulsion or artificial cream obtained by homogenizing fat in an nonfat milk product, such as skim milk or skim milk to which milk proteins and/or whey protein have been added, whey in which milk protein products are dissolved, milk protein concentrates or whey protein concentrates obtained by membrane filtration of milk or whey and solutions of skim milk powders, whey powders, milk proteins, whey proteins,if required in combination with lactose or other sugars. If desired for the flavour, real cream or whole milk may also be included in the base, but in this case the product becomes more sensitive to oxidation.

In order to improve the alcohol stability of the emulsion, it is conventional to add to such an artificial cream a stabilizer, such as pectin, carboxymethyl cellulose or other suitable polymeric thickeners. Especially when the desired beverage is soured, it is important to treat the cream in the proper way, so that the best possible emulsification of the fat is obtained. But also with non-soured beverages a proper selection of temperature homogenization pressure, number of homogenizations and further treatments is of great importance to obtaining a good stability. The selection of those conditions, however, depends on the desired alcohol content, fat content, the acidity and further variables, so that a worker skilled in the field of liqueur preparation will determine those conditions in accordance with the type of beverage.

In the preparation of soured beverages there may be used cream or yoghurt soured by the natural microbiological process, but a food grade acid may also be added as an ingredient to the previously prepared cream. In the latter case proper use can be made of the method of souring at a low temperature as described in European patent application EP 0 177 077.

Both in regard to the sweetness of the beverage and in connection with the further effect on the flavour impression of the beverage it is conventional to also add sugar to a base for the liqueur preparation. In the case of milk products soured by a microbiological process this addition of sugar is best effected after souring, but in other cases this sugar can just as well be included in the mixture at the beginning of the process.

The nonalcoholic base is generally quite storable in ready condition, i.e. packaged in a durable and appropriate manner, and serves as a starting material for a plurality of different liqueurs, depending on flavour, alcohol content etc. A thus prepared base may also be supplied by a central supplier to liqueur distillers who, on their own discretion, can further process the base to a ready-for-use bottled liqueur. But such a nonalcoholic base can also be supplied to consumers or hotel and catering industries in bottled condition so that with such a base they can mix to taste a beverage with the general character of a dairy liqueur.

The invented liqueur may be prepared both with a high and with a low percentage of alcohol. In both cases the selection of the fat used according to the invention has a favourable effect on the stability of the product after the bottle has been opened, both if the product is stored in uncooled condition and at refrigerator temperature. But at low alcohol contents it is not only the oxidation stability that causes problems during storage of an opened bottle of liqueur outside the refrigerator. In order to avoid the risk of spoilage by microorganisms, such as bacteria or yeasts, it is necessary to store an opened bottle in cooled condition.

In that case it is particularly the stability of the beverage at refrigerator temperatures that imparts a liqueur according to the invention an advantage over well-known types of liqueur.

The invention will now be illustrated by the following Examples:

EXAMPLE 1

Of the raw materials listed in Table I, with the exception of the stabilizer dispersed in the sugar syrup, mixtures were made. These were first homogenized at a temperature of 45° C. in two stages at 220/40 bar, and then once more at a temperature of 86° C. This base was then cooled to a temperature ranging from 0° to 2° C. and soured at this temperature with lactic acid to a pH of 3.8–4.0. Then the stabilizer dispersed in the sugar syrup was added. After heating there was once more homogenized and cooled back to room temperature.

Of this base, liqueurs were made by adding a mixture of alcohol, sugar syrup, flavouring and water so that the final alcohol content was 15 vol. % and the sugar content 23 wt. %.

In storage tests lasting up to 200 days it was found that all the liqueur samples remained physically stable at room temperature. The liqueur with hardened coconut oil and the liqueur with MCT oil did not even at room temperature give an oxidation flavour development. Nor did this occur after the product was stored in a repeatedly opened bottle. The cream-based liqueur rapidly showed a deviation in flavour. In the refrigerator the flavour of the products kept a longer time, but then it turned out that the liqueur with hardened coconut oil tended to form a fat clot in the neck of the bottle. Moreover, demixing was observed. In the refrigerator the flavour of the product kept a longer time than that of the product with milk fat, while no destabilisation was noticed.

EXAMPLE 2

Of the raw materials listed in Table II, mixtures were made, which were processed to liqueur base in the same manner as in Example I. All the liqueurs prepared with MCT oil, both in unopened and in closed bottles, both at room temperature and at a temperature of 5° C., showed a good flavour stability and a good stability of fat distribution and further outward characteristics. The liqueur prepared with cream already developed an oxidation flavour after a short storage time.

EXAMPLE 3

Of 800 g skim milk and 200 g MCT oil a homogeneous mixture was made by mixing and homogenizing; at a temperature of 80° C. a two-stage homogenization was carried out twice at 220/20 bar. This mixture was cooled back to 31° C. and soured by adding a mixed culture of the Ist type suitable for yoghurt preparation until the pH below 4.0 was reached. After adding the stabilizer dispersed in sugar syrup the product was homogenized at 150 bar, heated further to 90° C. and once more homogenized. Then the base was mixed after cooling for the preparation of the recipes listed in Table III. Because of the low alcohol content the recipes B,C and D were pasteurized in the package. Recipe C was impregnated with $CO_2$ before packaging so that it was packaged in carbonated condition.

EXAMPLE 4

Of the raw materials listed in Table IV mixtures were made and homogenized at a temperature of 80° C. at 260/40 bar. Then the mixture was heated further to 120° C., cooled back to 80° C. and once more homogenized. These products were mixed with a mix comprising molasses alcohol, sugar syrup, flavouring and water so that liqueurs had an alcohol percentage of 15 vol. % and a sugar percentage of 20 wt. %. These liqueurs showed a good oxidation stability and a good stability of the fat distribution.

TABLE I

| Sample code | (recipe in grams) | | |
|---|---|---|---|
| | A | B | C |
| skim milk | 234.9 | 379.9 | 484.9 |
| Cream | 250.0 | 0.0 | 0.0 |
| Hardened coconut oil | 0.0 | 105.0 | 0.0 |
| MCT oil | 0.0 | 0.0 | 105.0 |
| Stabilizer | 8.0 | 8.0 | 8.0 |
| Sugar syrup 62.5 B | 88.1 | 88.1 | 88.1 |
| Water | 419.0 | 419.0 | 314.0 |
| Total | 1000.0 | 1000.0 | 1000.0 |

TABLE II

| Sample code: | (recipe in grams) | | | | |
|---|---|---|---|---|---|
| | A | B | C | D | E |
| Skim milk | 234.9 | 379.9 | 432.4 | 0.0 | 0.0 |
| Cream | 250.0 | 0.0 | 0.0 | 0.0 | 0.0 |
| MCT oil | 0.0 | 105.0 | 52.5 | 105.0 | 105.0 |
| Whey protein 78% | 0.0 | 0.0 | 0.0 | 14.7 | 7.3 |
| NaCa caseinate | 0.0 | 0.0 | 0.0 | 0.0 | 6.1 |
| Lactose | 0.0 | 0.0 | 0.0 | 15.7 | 15.7 |
| Stabilizer | 8.0 | 8.0 | 8.0 | 8.0 | 8.0 |
| Sugar syrup 62.5 B | 88.1 | 88.1 | 88.1 | 88.1 | 88.1 |
| Water | 419.0 | 419.0 | 419.0 | 768.5 | 769.8 |
| Total | 1000.0 | 1000.0 | 1000.0 | 1000.0 | 1000.0 |

TABLE III

| Sample code: | (recipe in grams) | | | |
|---|---|---|---|---|
| | A | B | C | D |
| MCT emulsion 20% (acid) | 275.0 | 275.0 | 275.0 | 387.0 |
| Sugar syrup 62.5 B | 225.9 | 185.4 | 158.3 | 317.9 |
| Molasses alcohol 96% vol. | 118.2 | 60.3 | 0.0 | 0.0 |
| Fruit flavouring 65% vol. | 0.0 | 7.2 | 7.2 | 0.0 |
| Wine 12% vol. | 0.0 | 0.0 | 337.9 | 0.0 |
| Fruit concentrate | 209.7 | 0.0 | 0.0 | 295.1 |
| Water | 181.2 | 479.1 | 226.6 | 0.0 |
| Total | 1000.0 | 1000.0 | 1000.0 | 1000.0 |

TABLE IV

| Sample code: | (recipe in grams) | | | | |
|---|---|---|---|---|---|
| | A | B | C | D | E |
| Skim milk | 484.4 | 643.5 | 811.7 | 0.0 | 0.0 |
| Cream | 515.6 | 0.0 | 0.0 | 0.0 | 0.0 |
| MCT oil | 0.0 | 216.5 | 108.3 | 216.5 | 216.50 |
| Whey protein 78% | 0.0 | 0.0 | 0.0 | 30.3 | 15.1 |
| NaCa caseinate | 0.0 | 0.0 | 0.0 | 0.0 | 12.6 |
| Protein concentrate | 140.0 | 140.0 | 80.0 | 0.0 | 0.0 |
| Lactose | 0.0 | 0.0 | 0.0 | 32.4 | 32.4 |
| Water | 0.0 | 0.0 | 0.0 | 720.8 | 723.4 |
| Total | 1140.0 | 1000.0 | 1000.0 | 1000.0 | 1000.0 |

We claim:

1. A storage stable liqueur or alcohol-containing beverage comprising as ingredients cream, yoghurt or another dairy product, and further comprising alcohol-containing liquid, flavoring agents, coloring agents, emulsifiers, stabilizers, sugars or artificial sweetening agents, fats, and acids wherein the fat primarily contains esters of saturated fatty acids mainly having 6–12 carbon atoms, and the beverage comprises from 0.5 to 25 volume % of alcohol.

2. A liqueur or alcohol-containing beverage according to claim 1, wherein the fat used is one or more medium chain triglyceride having a saponification number of 325 of or more.

3. A liqueur or alcohol-containing beverage according to claim 2, wherein the fat used is obtained by fractionating or transesterifying milk fat or both.

4. A liqueur or alcohol-containing beverage according to claim 2, wherein the saponification number ranges from 325 to 350.

5. A liqueur or alcohol-containing beverage according to claim 1, wherein the iodine number of the fat used in not more than 5.

6. A liqueur or alcohol-containing beverage according to claim 5, wherein the fat used is obtained by fractionating or transesterifying milk fat or both.

7. A liqueur or alcohol-containing beverage according to claim 1, wherein the turbidity point of the fat used is below 5° C.

8. A liqueur or alcohol-containing beverage according to claim 1, wherein the dairy product used is skim milk, a mixture of skim milk and milk products or a mixture thereof whey protein or a solution of milk protein products and sugars.

9. A liqueur or alcohol-containing beverage according to claim 1, wherein the dairy product used is skim milk, a mixture of skim milk and milk proteins or a mixture thereof whey protein or a solution of milk proteins and sugars in which the fat is emulsified, to obtain a creamy emulsion.

10. A liqueur or alcohol-containing beverage according to claim 1, wherein the pH of the dairy product used is decreased to a value below 4.5 by microbiologically souring or by adding a food grade acid.

11. A liqueur or alcohol-containing beverage according to claim 1, wherein the stabilizer added is pectin or carboxymethyl cellulose.

12. A liqueur or alcohol-containing beverage according to claim 1, wherein, following the preparation of a nonalcoholic base, alcohol and further flavouring agents are added to said base.

13. A liqueur or alcohol-containing beverage according to claim 1, wherein it contains 1-25 wt. % fat.

14. A liqueur of alcohol-containing beverage according to claim 13, wherein the fat used is obtained by fractionating or transesterifying milk fat or both.

15. A liqueur or alcohol-containing beverage according to claim 1, wherein the fat used is obtained by fractionating or transesterifying milk fat or both.

16. A liqueur or alcohol containing beverage according to claim 1 which is carbonated.

* * * * *